(12) United States Patent
Zhang et al.

(10) Patent No.: US 12,643,234 B2
(45) Date of Patent: Jun. 2, 2026

(54) NONLINEAR ADAPTIVE CONTROL METHOD AND SYSTEM FOR MECHANICAL ARM MOTION CONTROL

(71) Applicant: TIANJIN SAIXIANG TECHNOLOGY CO., LTD, Tianjin (CN)

(72) Inventors: Xiaochen Zhang, Tianjin (CN); Qiping Chu, Tianjin (CN); Jianhao Zhang, Tianjin (CN)

(73) Assignee: TIANJIN SAIXIANG TECHNOLOGY CO., LTD, Tianjin (CN)

( * ) Notice: Subject to any disclaimer, the term of this patent is extended or adjusted under 35 U.S.C. 154(b) by 30 days.

(21) Appl. No.: 18/869,498

(22) PCT Filed: Jun. 1, 2022

(86) PCT No.: PCT/CN2022/096576
§ 371 (c)(1),
(2) Date: Nov. 26, 2024

(87) PCT Pub. No.: WO2023/226070
PCT Pub. Date: Nov. 30, 2023

(65) Prior Publication Data
US 2025/0326117 A1      Oct. 23, 2025

(30) Foreign Application Priority Data
May 26, 2022    (CN) .......................... 202210580218.3

(51) Int. Cl.
*B25J 9/16*        (2006.01)
*B25J 18/00*       (2006.01)
(52) U.S. Cl.
CPC ........... *B25J 9/1664* (2013.01); *B25J 9/1605* (2013.01); *B25J 18/00* (2013.01)

(58) Field of Classification Search
CPC ........ B25J 9/1664; B25J 9/1605; B25J 18/00; B25J 9/16; G05B 13/042; G05B 13/04
See application file for complete search history.

(56) References Cited

U.S. PATENT DOCUMENTS

2008/0177280 A1*  7/2008  Adler ..................... A61B 90/10
                                                    901/41
2014/0046483 A1*  2/2014  Oaki .......................... B25J 9/16
                                                    901/20
(Continued)

FOREIGN PATENT DOCUMENTS

CN          106842954 A      6/2017
CN          107505846 A     12/2017
(Continued)

OTHER PUBLICATIONS

Zhou et al (Extended Incremental Nonlinear Dynamic Inversion for Optical Flow Control of Micro Air Vehicles, Aerospace Science and Technology, vol. 116, 2021). (Year: 2021).*

*Primary Examiner* — Masud Ahmed
(74) *Attorney, Agent, or Firm* — MUNCY, GEISSLER, OLDS & LOWE, P.C.

(57) ABSTRACT

A nonlinear adaptive motion control method for robotic arm manipulation includes steps including inputting an output of the incremental nonlinear dynamic inversion controller to a servo motor drive configurable to drive the robotic arm; the system being provided to carry out the method. The method overcomes the problems of conventional robotic arm motion control technologies in identifying the movement load model and tuning the controller time-variant parameters, without relying on the robotic arm motion load model and external disturbance model which are conventionally required in tuning controller parameters. Since the difficulties and problems cannot be effectively solved by far, the (Continued)

disclosure offers a simple, effective, efficient control method and system for robotic arm movement.

2 Claims, 2 Drawing Sheets

(56) References Cited

U.S. PATENT DOCUMENTS

| | | | |
|---|---|---|---|
| 2020/0171666 A1* | 6/2020 | Huang | B25J 9/1692 |
| 2022/0009095 A1* | 1/2022 | Huang | B25J 9/1607 |
| 2022/0076800 A1* | 3/2022 | Greenwood | G16H 20/17 |

FOREIGN PATENT DOCUMENTS

| | | | |
|---|---|---|---|
| CN | 108406779 A | 8/2018 | |
| CN | 110262255 A | 9/2019 | |
| CN | 111775142 A | 10/2020 | |
| CN | 111941432 A | 11/2020 | |
| CN | 112817231 A | 5/2021 | |
| CN | 112947293 A | 6/2021 | |
| CN | 113276114 A | 8/2021 | |
| CN | 113824378 A | 12/2021 | |

* cited by examiner obtain a measured value q of a rotational angle of a robotic arm joint compute a second-order time derivative $d^2q/dt^2$ of the measured value $q$ of the rotational angle of the robotic arm joint give a desired value $q_d$ of the rotational angle of the robotic arm joint input a difference between the desired value $q_d$ and the measured value $q$ of the rotational angle of the robotic arm joint to a motion controller input an output of the motion controller and the second-order time derivative $d^2q/dt^2$ to an incremental nonlinear dynamic inversion controller $$\Delta u = M(q)\left[v - \left(\frac{d^2q}{dt^2}\right)_k\right]$$

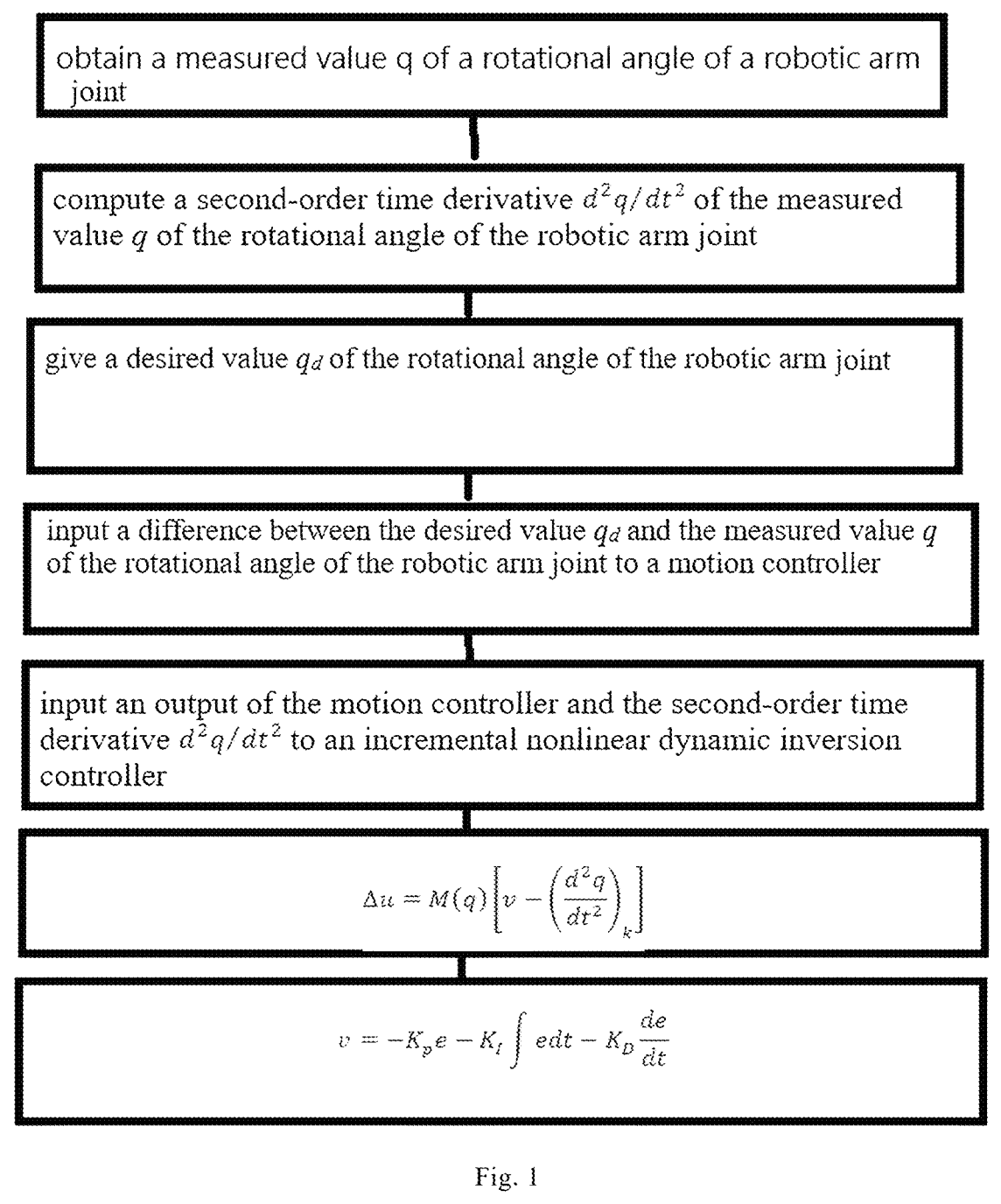

$$v = -K_p e - K_I \int e\,dt - K_D \frac{de}{dt}$$

Fig. 1

NONLINEAR ADAPTIVE CONTROL METHOD AND SYSTEM FOR MECHANICAL ARM MOTION CONTROL

FIELD

The disclosure relates to robotic arm motion control, and more particularly relates to a nonlinear adaptive motion control method and system for robotic arm manipulation.

BACKGROUND

With constant advancements in smart technologies, smart devices have gained increased use in people's everyday life, work, and study, which improves life quality and enhances learning and work efficiency. As far as motion control of a robotic arm is concerned, its robotic arm system is substantially nonlinear, time-varying, and uncertain, so that a nonlinear adaptive control algorithm is needed in designing its control system.

Existing systems for robotic arm motion control generally adopt a traditional PID (Proportional, Integral, and Differential) control algorithm. The PID control algorithm is a linear system-oriented control algorithm, so that when the PID algorithm is applied to control nonlinear motion of a robotic arm, a problem would arise as to how to tune the Proportional, Integral, and Differential parameters. Due to the nonlinear, time-varying, and uncertain properties of the robotic arm system, it is essential to identify the non-linear or linear models of the robotic arm in both off-line or on-line manners, as well as of its load and external disturbances. The identified models of the robotic arm and of its load and external disturbances are applied in tuning the PID parameters instantly or by segments. The parameters of traditional PID algorithms are constant throughout the control process, while in practical applications, the entire controlled system, particularly the motion and environment of a general-purpose robotic arm, is unpredictable, so that the invariant PID parameters cannot contribute a high-performance control effect to the system. Although notable control performance can be achieved by model identification, system complexity would increase, particularly in the case of online model identification. In addition, model identification cannot guarantee the accuracy of the models or model parameters identified, and such an adaptive control system can hardly pass an industrial certification. Other adaptive or smart control methods, such as fuzzy control, sliding mode control, neural network-based control, model reference adaptive control (MRAC), also fail to ensure algorithmic stability or guarantee a stable operation under any operating load and external disturbances.

By far, no effective solutions have been proposed to address the above problems.

SUMMARY

A nonlinear adaptive motion control method for robotic arm manipulation and a corresponding system are provided. The disclosure overcomes the problems of conventional robotic arm motion control technologies in identifying their motion load models and tuning the time-varying parameters of their controllers, without relying on the robotic arm motion load model and external disturbance model which are conventionally leveraged in tuning controller parameters. In a case that the difficulties and problems cannot be effectively solved by far, the disclosure offers a simple, effective, efficient motion control method for robotic arm manipulation.

The nonlinear adaptive motion control method for robotic arm manipulation as described herein comprises steps of: building a holonomic nonlinear dynamics model corresponding to a n-link robotic arm by Lagrangian dynamics modeling; obtaining a measured value q of a rotational angle of a robotic arm joint; computing a second order time derivative $d^2q/dt^2$ of the measured value q of the rotational angle of the robotic arm joint by numerical differentiation; generating a desired value $q_d$ of the rotational angle of the robotic arm joint according to a programmed movement of the robotic arm; inputting a difference between the desired value $q_d$ and the measured value q of the rotational angle of the robotic arm joint to a motion controller; inputting an output of the motion controller and the second order time derivative $d^2q/dt^2$ to an incremental nonlinear dynamic inversion controller; and inputting a control command outputted by the incremental nonlinear dynamic inversion controller to a servo motor drive configurable to drive the robotic arm;

wherein the incremental nonlinear dynamic inversion controller is described as:

$$\Delta u = M(q)\left[v - \left(\frac{d^2q}{dt^2}\right)_k\right]$$

where $\Delta u$ denotes the control command outputted by the incremental nonlinear dynamic inversion controller; q denotes the rotational angle of the robotic arm joint; M(q) denotes an inertia matrix of the robotic arm model;

$$\left(\frac{d^2q}{dt^2}\right)_k$$

denotes an angular acceleration of the robotic arm joint obtained from computing the second order time derivative of the rotational angle q of the robotic arm joint; v denotes a virtual control variable of the incremental nonlinear dynamic inversion controller;

wherein the virtual control variable of the incremental nonlinear dynamic inversion controller is given by a PID controller according to an equation below:

$$v = -K_p e - K_I \int edt - K_D \frac{de}{dt}$$

where $e = q - q_d$ denotes the difference between the measured rotational angle and the desired rotational angle of the robotic arm joint; $K_p$ denotes a Proportional parameter of the motion controller; $K_I$ denotes an Integral parameter of the motion controller; and $K_D$ denotes a Differential parameter of the motion controller.

The disclosure further discloses a nonlinear adaptive motion control system for robotic arm manipulation, comprising a processor and a memory, the memory storing a computer-readable instruction, the processor being configured to execute the computer-readable instruction, wherein when the computer-readable instruction is executed, the nonlinear adaptive motion control method for robotic arm manipulation as noted supra is carried out.

In the implementations of the disclosure, the second time derivative (i.e., the angular acceleration of the robotic arm joint) of the rotational angle of the robotic arm joint is used in replacement of the models of the robotic arm system as well as of its load and external disturbances, which eliminates a need for the models of the robotic arm system as well as of its load and external disturbances in the dynamic inversion control, thereby overcoming the problems of conventional robotic arm motion control technologies in identifying their motion load models and tuning the time-varying parameters of their controllers.

According to a further aspect of the disclosure, there is also provided a nonlinear adaptive motion control system for robotic arm manipulation, comprising a processor and a memory, the memory storing a computer-readable instruction, the processor being configured to execute the computer-readable instruction, wherein when the computer-readable instruction is executed, the nonlinear adaptive motion control method for robotic arm manipulation is carried out.

BRIEF DESCRIPTION OF THE DRAWINGS

The drawings illustrated herein are intended to facilitate understanding of the disclosure, which constitute an integral part of the disclosure; schematic implementations and their descriptions provided herein only serve for explaining the disclosure, not constituting undue limitations to the disclosure. In the drawings:

FIG. 1 is a flow diagram of a nonlinear adaptive motion control method for robotic arm manipulation according to some implementations of the disclosure;

DETAILED DESCRIPTION OF EMBODIMENTS

Figure 2:
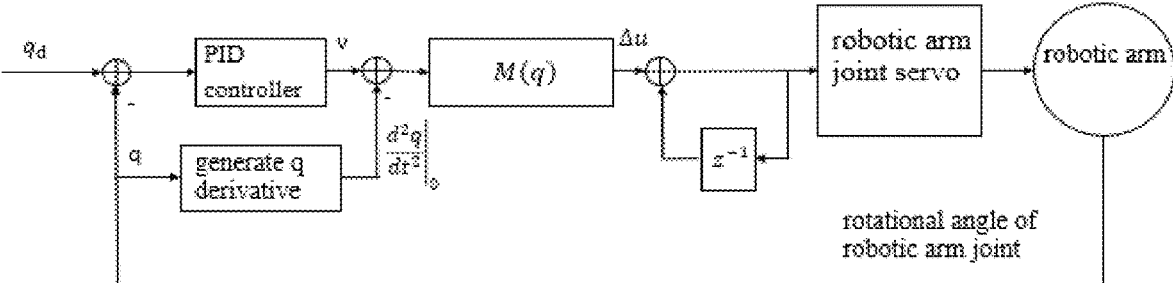
FIG. 2 is a structural block diagram of a nonlinear adaptive motion control system for robotic arm manipulation according to some implementations of the disclosure.

To facilitate those skilled in the art to understand the subject matter described herein, the technical solutions in some implementations of the disclosure will be described clearly and comprehensively with reference to the accompanying drawings. It is apparent that the implementations described herein are only part of the embodiments of the disclosure, not all of them. All other implementations derived by those skilled in the art based on the implementations described herein without exercise of inventive work shall fall within the protection scope of the disclosure.

It is noted that, the terms such as "first" and "second" referred to in the specification, claims, and drawings are used for distinguishing like objects, not necessarily used for describing a specific sequence or priority. It should be understood that features modified with such numerals may be swapped with each other in appropriate circumstances, such that the implementations of the disclosure described herein can be carried out in a sequence not illustrated or described herein. In addition, the terms such as "comprise" and "have," as well as any of their variants, are intended for a non-exclusive inclusion, e.g., a process, a method, a system, a product, or an apparatus comprising a series of steps or elements is not necessarily limited to those steps or elements explicitly limited therein, but may further comprise other steps or elements not explicitly limited therein or inherent to such a process, method, system, product or apparatus.

According to some implementations of the disclosure, there is provided a nonlinear adaptive motion control method for robotic arm manipulation. It is noted that, the steps illustrated in the flow diagram in the accompanying drawings may be executed for example in a computer system with a set of computer-executable instructions; in addition, although a logic sequence is illustrated in the flow diagram, the illustrated or described steps may also be executed in a sequence different from what are described herein.

FIG. 1 is a flow diagram of a nonlinear adaptive motion control method for robotic arm manipulation according to some implementations of the disclosure. As illustrated in FIG. 1, the method comprises steps of:

Step S100, in which a measured value q of a rotational angle of a robotic arm joint is obtained;

Step S200, in which a second order time derivative $d^2q/dt^2$ of the measured value q of the rotational angle of the robotic arm joint is computed by numerical differentiation;

Step S300, in which a difference between a desired value $q_d$ and the measured value q of the rotational angle of the robotic arm joint is inputted to a motion controller;

Step S400, in which an output of the motion controller and the second order time derivative $d^2q/dt^2$ are both inputted to an incremental nonlinear dynamic inversion controller;

Step S500, in which an output of the incremental nonlinear dynamic inversion controller is inputted to a servo motor drive configurable to drive the robotic arm;

Step S600, in which an incremental output of the incremental dynamic inversion controller is computed;

Step S700, in which the motion controller is computed.

This motion control method for robotic arm manipulation comprises the steps below: building a holonomic nonlinear dynamics model corresponding to a n-link robotic arm by Lagrangian dynamics modeling; obtaining a measured value q of a rotational angle of a robotic arm joint; computing a second order time derivative $d^2q/dt^2$ of the measured value q of the rotational angle of the robotic arm joint by numerical differentiation; generating a desired value $q_d$ of the rotational angle of the robotic arm joint according to a programmed movement of the robotic arm; inputting a difference between the desired value $q_d$ and the measured value q of the rotational angle of the robotic arm joint to a motion controller; inputting an output of the motion controller and the second order time derivative $d^2q/dt^2$ to an incremental nonlinear dynamic inversion controller; and inputting a control command outputted by the incremental nonlinear dynamic inversion controller to a servo motor drive configurable to drive the robotic arm.

The incremental nonlinear dynamic inversion controller is described as:

$$\Delta u = M(q)\left[v - \left(\frac{d^2q}{dt^2}\right)_k\right]$$

where $\Delta u$ denotes a command outputted by the incremental nonlinear dynamic inversion controller; q denotes the rotational angle of the robotic arm joint; M(q) denotes an inertia matrix of the robotic arm model;

$$\left(\frac{d^2q}{dt^2}\right)_k$$

denotes an angular acceleration of the robotic arm joint obtained from computing the second order time derivative of the rotational angle q of the robotic arm joint; v denotes a virtual control variable of the incremental nonlinear dynamic inversion controller.

The virtual control variable of the incremental nonlinear dynamic inversion controller is given by a conventional PID controller below:

$$v = -K_p e - K_I \int e \, dt - K_D \frac{de}{dt}$$

where $e=q-q_d$ denotes the difference between the measured rotational angle and the desired rotational angle of the robotic arm joint; $K_p$ denotes the Proportional parameter of the motion controller; $K_I$ denotes the Integral parameter of the motion controller; and $K_D$ denotes the Differential parameter of the motion controller.

This incremental dynamic inversion control method is derived based on the principle described infra.

The robotic arm model is built by Lagrangian dynamics modeling, as given below:

$$M(q)\frac{d^2q}{dt^2} + C\left(q, \frac{dq}{dt}\right) + C_v\frac{dq}{dt} + G(q) + F = \Gamma \qquad (1)$$

where q denotes a rotational angle of the robotic arm joint; dq/dt denotes an angular velocity of the robotic arm joint;

$$\frac{d^2q}{dt^2}$$

denotes an angular acceleration of the robotic arm joint; M(q) denotes an inertia matrix of the robotic arm system;

$$C\left(q, \frac{dq}{dt}\right)$$

denotes Coriolis- and centrifugal-force vectors of the system; $C_v$ denotes a viscous friction coefficient matrix of the joint; G(q) denotes a gravity vector; F denotes an external disturbance vector; $\Gamma$ denotes a control torque vector.

The equation (1) may also be expressed as:

$$\frac{d^2q}{dt^2} = \qquad (2)$$

$$M^{-1}(q)\Gamma - M^{-1}(q)C\left(q, \frac{dq}{dt}\right) - M^{-1}(q)C_v\frac{dq}{dt} - M^{-1}(q)G(q) - M^{-1}(q)F$$

which is simplified to:

$$\frac{d^2q}{dt^2} = f\left(q, \frac{dq}{dt}, u\right) \qquad (3)$$

-continued
where $$f\left(q, \frac{dq}{dt}, u\right) = \qquad (4)$$

$$M^{-1}(q)\Gamma - M^{-1}(q)C\left(q, \frac{dq}{dt}\right) - M^{-1}(q)C_v\frac{dq}{dt} - M^{-1}(q)G(q) - M^{-1}(q)F$$

$$\text{and } u = \Gamma \qquad (5)$$

The equation (4) is expanded with respect to the vector series at the sampling time point, obtaining:

$$\frac{d^2q}{dt^2} = f_k\left(q, \frac{dq}{dt}, u\right) + \frac{\partial f\left(q, \frac{dq}{dt}, u\right)}{\partial q}(q_k - q_{k-1}) + \qquad (6)$$

$$\frac{\partial f\left(q, \frac{dq}{dt}, u\right)}{\partial \frac{dq}{dt}}\left(\frac{dq}{dt_k} - \frac{dq}{dt}_{k-1}\right) + \frac{\partial f\left(q, \frac{dq}{dt}, u\right)}{\partial u}(u_k - u_{k-1})$$

The following are obtained under the current sampling time based on the time-variant characteristics of respective variables:

$$\Delta u = (u_k - u_{k-1}) = \left[\frac{\partial f\left(q, \frac{dq}{dt}, u\right)}{\partial u}\right]^{-1}\left[v - \left(\frac{d^2q}{dt^2}\right)_k\right] \qquad (7)$$

where $$\Delta u = (u_k - u_{k-1}) \qquad (8)$$

$$\left(\frac{d^2q}{dt^2}\right)_k = f_k\left(q, \frac{dq}{dt}, u\right) \qquad (9)$$

$$\left[\frac{\partial f\left(q, \frac{dq}{dt}, u\right)}{\partial u}\right]^{-1} = M(q) \qquad (10)$$

$$v = -K_p e - K_I \int e \, dt - K_D \frac{de}{dt} \qquad (11)$$

$$e = q - q_d \qquad (13)$$

$$\text{where}\left(\frac{d^2q}{dt^2}\right)_k$$

in equation (7) denotes a second order time derivative of the rotational angle of the robotic arm joint, i.e., the angular acceleration of the robotic arm joint at sampling time k. It can be seen from equation (2) that this angular acceleration includes all information of the system, where the angular acceleration is used to replace the system model conventionally needed by the controller.

The serial numbers referred to in the implementations described supra are only for descriptive purposes, and the specific numerical values assigned thereto do not indicate one implementation is better than another.

The implementations described supra focus on different parts of the disclosure, where a part not depicted in one implementation may refer to relevant depictions in another implementation.

In the implementations provided herein, it should be understood that the technical contents disclosed herein may be implemented in other manners. The apparatus embodiments described supra are only schematic, e.g., the units may be partitioned by logic functions; in practice, the partition may have alternative partition manners, e.g., a plurality of units or components may be combined with or integrated to another system, or some features may be omitted or may not be executed. Additionally, the mutual coupling, or direct coupling, or communication connection between what are displayed or discussed may be via some interfaces; the indirect coupling or communication connection between the units or modules may be of an electrical or otherwise form.

The units described as discrete parts may be or may not be physically separated; the parts displayed as units may or may not be physical units, i.e., they may be located at a same place or may be distributed on a plurality of units. Part or all of the units may be selected to achieve the objectives of the solutions in the implementations of the disclosure according to actual needs.

Additionally, various functional units in the implementations of the disclosure may be integrated on one processing unit, or may be physically existent standalone; or, two or more of the implemented above may be integrated on one unit. The integrated unit may be implemented in a hardware form or in a software functional unit form.

The integrated unit, if implemented in a software functional unit form and sold or used as a standalone product, may be stored in one computer-readable storage medium. Based on this understanding, the substantive technical solution of the disclosure, or the part contributing to the prior art, or all or part of the technical solution, may be embodied in a form of software product; the computer software product is stored in one storage medium, including a plurality of instructions to cause a computer device (which may be a personal computer, a server, or a network device) to execute all or part of the method described in various implementations of the disclosure. The storage medium includes various mediums that may store program code, such as a USB device, a ROM (Read-Only Memory), a RAM (Random Access Memory), a mobile hard disc, a magnetic disc, or an optical disc.

What have been described supra are only preferred implementations of the disclosure. It should be noted that, to a person of normal skill in the art, various alterations and modifications may also be made without departing from the principle of the disclosure, and such alterations and modifications should also be deemed as falling within the protection scope of the disclosure.

We claim:
1. A nonlinear adaptive motion control method for robotic arm manipulation, comprising:
building a holonomic nonlinear dynamics model corresponding to a n-link robotic arm by Lagrangian dynamics modeling;
obtaining a measured value q of a rotational angle of a robotic arm joint;
computing a second order time derivative $d^2q/dt^2$ of the measured value q of the rotational angle of the robotic arm joint by numerical differentiation;

8 generating a desired value $q_d$ of the rotational angle of the robotic arm joint according to a programmed movement of the robotic arm;
inputting a difference between the desired value $q_d$ and the measured value q of the rotational angle of the robotic arm joint to a motion controller;
inputting an output of the motion controller and the second order time derivative $d^2q/dt^2$ to an incremental nonlinear dynamic inversion controller; and
inputting an output value of the incremental nonlinear dynamic inversion controller to a servo motor drive configurable to drive the robotic arm,
wherein the incremental nonlinear dynamic inversion controller is described as:

$$\Delta u = M(q)\left[v - \left(\frac{d^2q}{dt^2}\right)_k\right]$$

where $\Delta u$ denotes a command outputted by the incremental nonlinear dynamic inversion controller; q denotes the rotational angle of the robotic arm joint; M(q) denotes an inertia matrix of the robotic arm model;

$$\left(\frac{d^2q}{dt^2}\right)_k$$

denotes an angular acceleration of the robotic arm joint obtained from computing the second order time derivative of the rotational angle q of the robotic arm joint; v denotes a virtual control variable of the incremental nonlinear dynamic inversion controller, and
wherein the virtual control variable of the incremental nonlinear dynamic inversion controller is given according to an equation below:

$$v = -K_p e - K_I \int edt - K_D \frac{de}{dt}$$

where $e=q-q_d$ denotes the difference between the measured rotational angle and the desired rotational angle of the robotic arm joint; $K_p$ denotes a Proportional parameter of the motion controller; $K_I$ denotes an Integral parameter of the motion controller; and $K_D$ denotes a Differential parameter of the motion controller.
2. A nonlinear adaptive motion control system for robotic arm manipulation, comprising a processor and a memory, the memory storing a computer-readable instruction, the processor being configured to execute the computer-readable instruction, wherein when the computer-readable instruction is executed, the nonlinear adaptive motion control method for robotic arm manipulation according to claim 1 is carried out.

* * * * *